United States Patent
Jeong

(10) Patent No.: US 6,308,046 B1
(45) Date of Patent: Oct. 23, 2001

(54) VIDEO/AUDIO ALARM PROCESSING METHOD AND APPARATUS FOR BASE STATION MANAGER IN MOBILE RADIO COMMUNICATION SYSTEM

(75) Inventor: Seok Jong Jeong, Kyungki-do (KR)

(73) Assignee: LG Information and Communications, Ltd., Seoul (KR)

( * ) Notice: Subject to any disclaimer, the term of this patent is extended or adjusted under 35 U.S.C. 154(b) by 0 days.

(21) Appl. No.: 09/195,562

(22) Filed: Nov. 19, 1998

(30) Foreign Application Priority Data

Dec. 31, 1997 (KR) .................................................. 97-82217

(51) Int. Cl.[7] .................................................. H04B 17/00
(52) U.S. Cl. .......................... 455/67.7; 455/404; 455/424
(58) Field of Search .................................. 455/67.1, 67.4, 455/67.7, 423, 424, 404; 379/8, 9, 32, 33

(56) References Cited

U.S. PATENT DOCUMENTS

| | | | |
|---|---|---|---|
| 5,095,500 | * | 3/1992 | Tayloe et al. .......................... 455/424 |
| 5,694,451 | * | 12/1997 | Arinell ................................. 455/67.1 |
| 5,719,563 | * | 2/1998 | Thompson, Jr. ...................... 455/67.1 |
| 5,857,012 | * | 1/1999 | Paul ..................................... 455/67.4 |
| 5,859,838 | * | 1/1999 | Soliman ............................... 455/67.4 |
| 5,974,313 | * | 10/1999 | Viljanen et al. ...................... 455/423 |

FOREIGN PATENT DOCUMENTS

| | | |
|---|---|---|
| 0845 915 A2 | 6/1998 | (EP) . |
| 1998-014313 | 5/1998 | (KR) . |
| 1998-029968 | 7/1998 | (KR) . |
| WO 98/05129 | 2/1998 | (WO) . |

* cited by examiner

Primary Examiner—Nay Maung
Assistant Examiner—Quochien B. Vuong
(74) Attorney, Agent, or Firm—Fleshner & Kim, LLP

(57) ABSTRACT

A video/audio alarm processing method and apparatus for a base station manager in a mobile radio communication system capable of classifying trouble state data of base station controllers and base stations by grades and informing to a user the trouble state as video and audio alarms in accordance with the classified grade of the trouble state data. According to the method, the data of a predetermined number of bits which is received from the base station controllers and base stations is converted and stored, and whether the trouble state data exists or not in the stored data is judged. If the trouble state data exists, it is classified by grades, and the video and audio alarms are produced in accordance with the classified grade of the trouble state data. The grade of the video and audio alarms corresponding to the grade of the trouble state data is classified into an emergent alarm, an important alarm, and a general alarm, and the video alarm is classified by colors such as red, yellow, and green according to the grade of the trouble state data.

15 Claims, 3 Drawing Sheets

VIDEO/AUDIO ALARM PROCESSING METHOD AND APPARATUS FOR BASE STATION MANAGER IN MOBILE RADIO COMMUNICATION SYSTEM

BACKGROUND OF THE INVENTION

1. Field of the Invention

The present invention relates to a video/audio alarm processing method and apparatus for a base station manager in a mobile radio communication system. In particular, the present invention relates to a video/audio alarm processing method and apparatus for a base station manager based on a workstation whereby the base station manager can process trouble state data of base station controllers and base stations, and produce video and audio alarms in accordance with the grade of the trouble state data.

2. Description of the Related Art

Generally, in a mobile radio communication system, a call message including the identification number of a calling mobile unit which attempts a call through a call control channel of a base station is transmitted to a called mobile unit, and a speech path is provided between the calling and called mobile units if a response is received from the called mobile unit.

However, in case of performing the call communications utilizing the mobile radio communication protocol regulated by Electronic Industries Association (EIA), the mobile unit may fail to receive the call message transmitted from the base station in a special condition, and thus the call communications between the terminating and originating mobile units may not be performed. Also, troubles of the function and connection/disconnection of circuit boards which constitutes the base station controller or the base station system, troubles of the physical paths through which the data communications are performed, or troubles caused by the connection/disconnection of various kinds of cables may occur.

In order to monitor such system troubles, the base station manager in a mobile radio communication system is provided with a trouble processing block for receiving the trouble state data from the respective base station controllers and base stations affiliated in the base station manager and outputting a trouble state message to a display screen provided in the workstation, and an audio alarm processing device for processing and outputting an audio alarm to a loudspeaker in the workstation.

Specifically, in order to monitor the trouble state of the base station controllers and base stations during the system operation, the conventional audio alarm processing device outputs the trouble state message provided from the base station manager to the display screen, and processes the audio alarm to drive the loudspeaker in the base station manager.

However, the conventional audio alarm processing device has the drawback that since it processes and outputs the audio alarm to the loudspeaker, it is difficult to identify the grade of the current trouble state of the system. It is also difficult to monitor the system trouble state at a remote place far apart from the base station manager.

Also, a base station manager may be provided with no loudspeaker in accordance with the kind of the workstation, and the monitoring of the system trouble state cannot be accurately achieved by such a base station manager having no loudspeaker.

Meanwhile, apparatuses for displaying the video alarm for the trouble state of the base station controllers and base stations with processing an audio alarm have been proposed. These apparatuses have the problems that separate constituent elements should be added, thereby increasing the manufacturing cost.

SUMMARY OF THE INVENTION

Accordingly, the present invention is directed to a video/audio alarm processing method and apparatus for a base station manager in a mobile radio communication system that substantially obviates one or more of the problems due to limitations and disadvantages of the related art.

An object of the present invention is to provide a video/audio alarm processing method and apparatus for a base station manager in a mobile radio communication system which can identify the grade of the trouble state of the base stations and base station controllers, and inform the trouble state to a user visibly and audibly in accordance with the identified grade of the trouble state.

It is another object of the present invention to provide a video/audio alarm processing method and apparatus for a base station manager in a mobile radio communication system whereby the trouble state of the respective systems can be easily monitored from various remote places besides the place where the base station, manager is located.

Additional features and advantages of the invention will be set forth in the description which follows, and in part will be apparent from the description, or may be learned by practice of the invention. The objectives and other advantages of the invention, will be realized and attained by the structure particularly pointed out in the written description and claims thereof as well as the appended drawings.

To achieve these and other advantages and in accordance with the purpose of the present invention, as embodied and broadly described, the video/audio alarm processing method for a base station manager in a mobile radio communication system for receiving and processing data transmitted from a plurality of base station controllers and base stations as video and audio alarms comprises the steps of converting the data received from the base station controllers and base stations into parallel data and storing the converted data so that trouble state data of the base station controllers and base stations is classified by grades, judging whether the trouble state data exists or not in the stored data, and if it is judged that the trouble state data exists, is producing the video and audio alarms in accordance with the classified grade of the trouble state data.

It is preferable that the grade of the video and audio alarms corresponding to the grade of the trouble state data is classified into emergent, important, and general alarms, respectively. Also, the video alarm may be classified by colors, i.e., red, yellow, and green according to the grade of the trouble state data.

In another aspect of the present invention, there is provided a video/audio alarm processing apparatus for a base station manager in a mobile radio communication system including an interworking processor board assembly for receiving and processing data transmitted from a plurality of base station controllers and base stations as video and audio alarms, the interworking processor board assembly comprising a trouble state detecting section for receiving the data of a predetermined number of bits transmitted from the base station controllers and the base stations and detecting existence of trouble state data, a video/audio control section for generating control clocks of a predetermined speed and control signals for the process of the video and audio alarms in accordance with an input of the detected trouble state data, a data. transmitting section for converting and transmitting the data received from the trouble state detecting section in accordance with the control clock and the control signal generated from the video/audio control section, a plurality of video/audio alarm sections for producing video and audio alarms in accordance with a trouble state grade of the trouble state data, an interface section for interfacing the data transmitted from the data transmitting section to the video/audio alarm sections and interfacing message data responding to the transmitted data outputted from the video/audio alarm sections, and a data receiving section for converting and transmitting to the trouble state detecting section the responding message received through the interface section in accordance with the control clock and the control signal generated from the video/audio control section.

Preferably, the trouble state detecting section comprises a central processing unit and its peripheral device for receiving and processing the data transmitted from the base station controllers and base stations, a data buffer for buffering the data received from the central processing unit and the responding message received from the data receiving section, and a transmission data detecting unit for detecting whether the trouble state data exists in the data buffered by the data buffer.

Preferably, the video/audio control section comprises a transmission/reception control unit for generating a control signal for controlling transmission/reception of the trouble state data if the existence of the trouble state data is detected by the trouble state detecting section, a transmission/reception clock generating unit for generating transmission and reception clocks of a predetermined speed in accordance with the control signal from the transmission/reception control unit, and a loopback control unit for monitoring an operating state of the video/audio alarm sections through the interface section and providing a detected result to the data receiving section.

Preferably, the data transmitting section comprises a transmission buffer for buffering the data received from the trouble state detecting section in accordance with the control signal from the video/audio control section, a transmission latch for latching the data buffered by the transmission buffer in accordance with the control signal from the video/audio control section, and a parallel/serial conversion unit for converting the data received from the transmission latch into serial data in accordance with the transmission clock provided from the video/audio control section and providing the converted serial data to the interface section.

Preferably, the data receiving section comprises a serial/parallel conversion unit for converting the responding message received from the interface section and the operating state data of the video/audio alarm sections received from the video/audio control section into parallel data in synchronization with the reception clock from the video/audio control section, a receiving latch for latching the converted parallel data for a predetermined time in accordance with the control signal from the video/audio control section, and a receiving buffer for buffering the latched parallel data in accordance with the control signal from the video/audio control section and outputting the buffered data to the trouble state detecting section as state information of the video/audio alarm sections.

According to the video/audio alarm processing apparatus for a base station manager for managing the trouble state of the base station controllers and base stations, the system trouble state is classified by grades and then informed to the user as the video and audio alarms, resulting in that the user can easily identify the trouble state grade of the respective systems and thus take the necessary process according to the identified trouble state grade.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiment of the present invention, examples of which are illustrated in the accompanying drawings.

Figure 1:
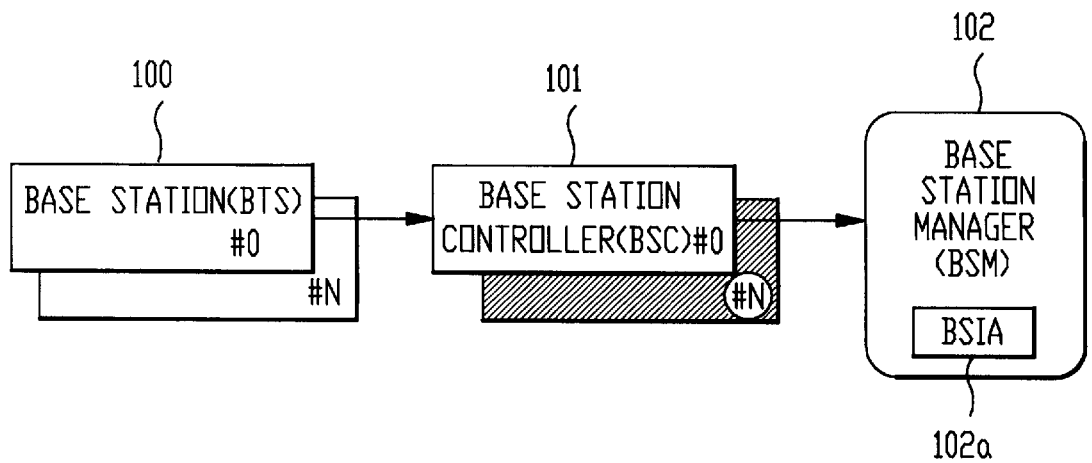
FIG. 1 is a block diagram schematically illustrating a conventional audio alarm processing device for a base station manager.

FIG. 1 is a block diagram schematically illustrating a conventional audio alarm processing device for a base station manager in a mobile radio communication system for receiving and processing trouble state data from the base station controllers and the base stations.

Referring to FIG. 1, the base station manager 102, which is an upper level system of the base station controllers 101 and the base stations 100, takes charge of the state monitoring function of the systems such as a program downloading to the respective base station controllers and base stations, traffic statistical process, collection and report of the trouble state of the respective systems.

The interworking processor board assembly 102a provided in the base station manager 102 is a card packaged in the workstation which is the basis of the base station manager 102, and takes charge of the matching function between the network and the workstation of the mobile radio communication system.

A base station manager 102 can receive 12 base station controllers 101 at maximum, and a base station controller 101 can receive 48 base stations 100 at maximum.

The trouble state data of the respective base stations 100 and base station controllers 101 is transferred to the base station manager 102 through the network composed of the base stations 100, base station controllers 101 and base station manager 102.

The trouble processing block in the base station manager 102 receives and manages the trouble state data of the lower level systems through the above described process, and outputs the trouble state data to the display screen provided in the workstation. Also, if an audio alarm is required with respect to the trouble state as above, the trouble processing block processes and outputs the audio alarm to the loudspeaker.

However, the conventional audio alarm processing device has the drawback that it is difficult to identify the grade of the trouble state of the system, and thus an effective alarm process cannot be achieved.

Figure 2:
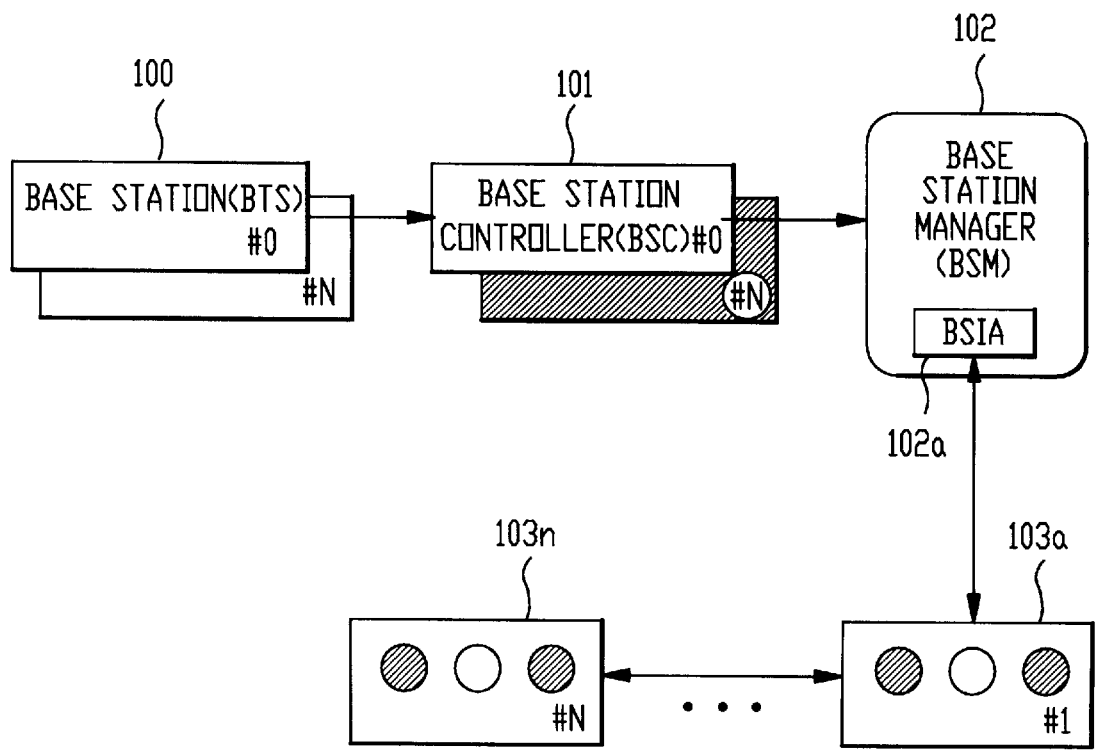
FIG. 2 is a block diagram schematically illustrating the base station manager incorporating the video/audio alarm processing method and apparatus according to the present invention.
Figure 3:
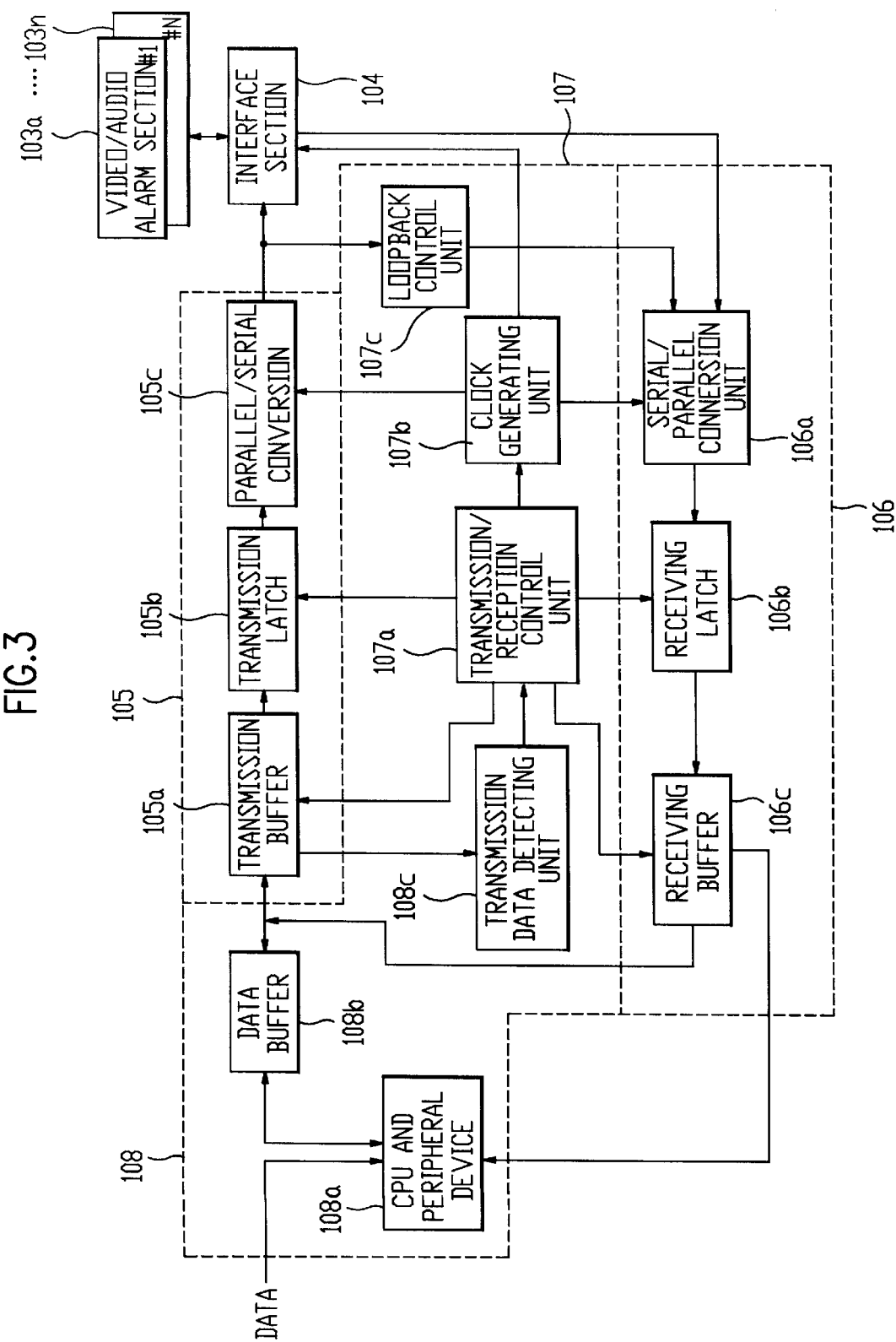
FIG. 3 is a block diagram of the video/audio alarm processing apparatus for a base station manager according to a preferred embodiment of the present invention.

The video/audio alarm processing apparatus according to the present invention can be applied to various data transmitting and receiving devices which remotely transmit data. FIGS. 2 and 3 illustrate the video/audio alarm processing apparatus according to the embodiment of the present invention applied to a data, transmitting and receiving device for remotely transmitting and managing data, and especially to the mobile radio communication system.

Figure 4:
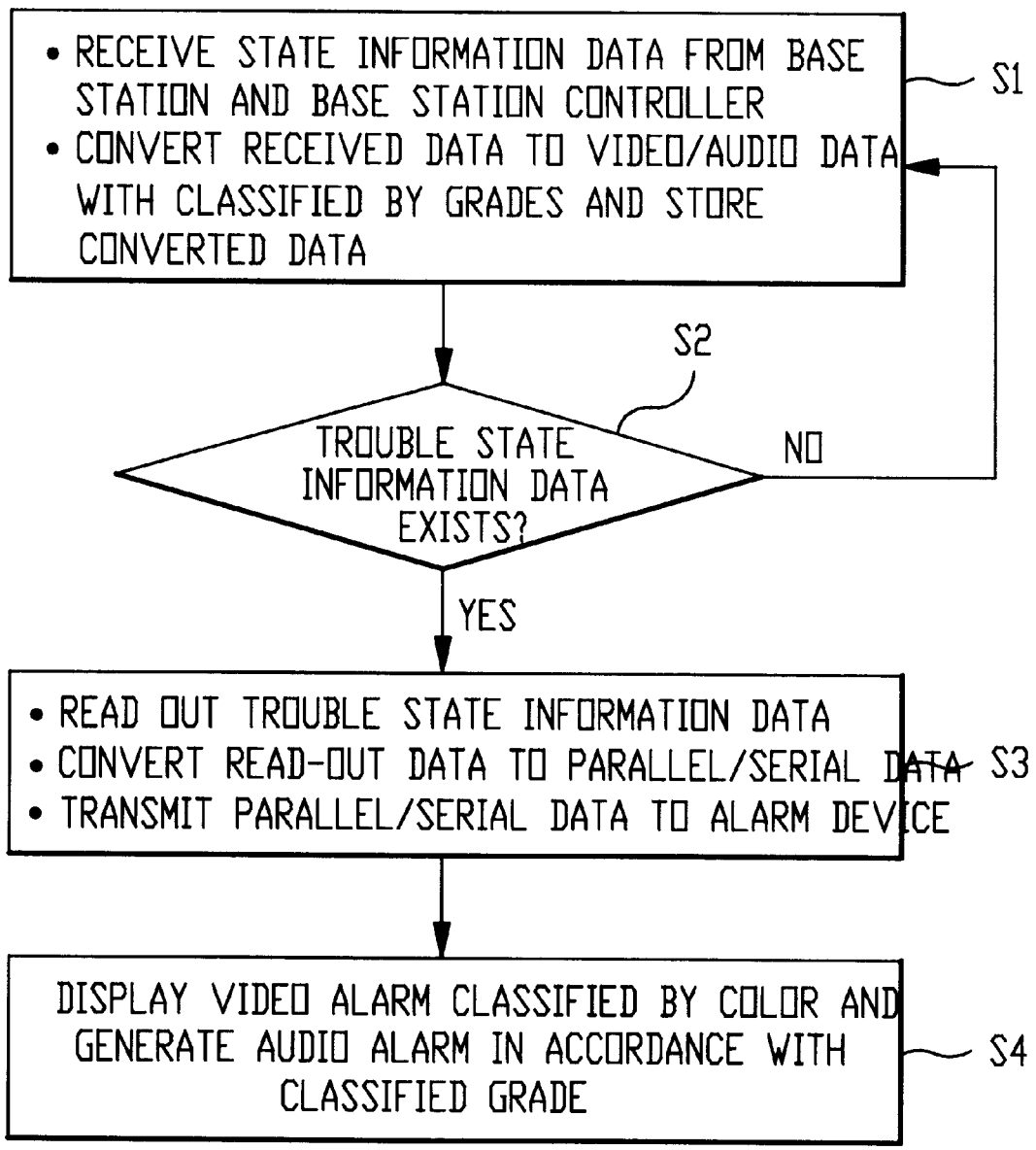
FIG. 4 is an algorithm diagram incorporating the video/audio alarm processing method for a base station manager according to the present invention.

FIG. 2 is a block diagram schematically illustrating the base station manager incorporating the video/audio alarm processing apparatus according to the present invention, and FIG. 3 is a block diagram of the video/audio alarm processing apparatus for a base station manager according to a preferred embodiment of the present invention. FIG. 4 is an algorithm diagram incorporating the video/audio alarm processing method for a base station manager according to the present invention.

Referring to FIG. 3. the video/audio alarm processing apparatus for a base station manager according to the present invention includes an interworking processor board assembly 102a for receiving and processing data transmitted from a plurality of base station controllers 101 and base stations 100 as video and audio alarms.

The interworking processor board assembly 102a comprises a trouble state detecting section 108 for receiving the data of 8 bits transmitted from the base station controllers 101 and the base stations 100 and detecting existence of trouble state data, a video/audio control section 107 for generating a control clock of a speed of 1200 bps and a control signal for the process of the video and audio alarms in accordance with an input of the detected trouble state data, a data transmitting section 105 for converting and transmitting the 8-bit data received from the trouble state detecting section 108 in accordance with the control clock and the control signal generated from the video/audio control section 107, a plurality of video/audio alarm sections 103a~103n for producing video and audio alarms in accordance with a trouble state grade of the trouble state data, an interface section 104 for interfacing the serial data transmitted from the data transmitting section 105 to the video/audio alarm sections 103a~103n and interfacing message data of a speed of 1200 bps responding to the transmitted data outputted from the video/audio alarm sections 103a~103n, and a data receiving section 106 for converting and transmitting to the trouble state detecting section 108 the responding message received through the interface section 104 in accordance with the control clock and the control signal generated from the video/audio control section 107.

The trouble state detecting section 108 comprises a central processing unit 108a and its peripheral device for receiving and processing the data transmitted from the base station controllers 101 and base stations 100 so that trouble state data of the base station controllers 101 and base stations 100 is classified by grades and colors, a data buffer 108b for bidirectionally buffering and outputting the 8-bit parallel data received from the central processing unit 108a and the responding message received from the data receiving section 106, and a transmission data detecting unit 108c for detecting whether the trouble state data exists in the 8-bit data buffered by the data buffer 108b.

The video/audio control section 107 comprises a transmission/reception control unit 107a for generating a control signal for controlling transmission/reception of the trouble state data if the existence of the trouble state data is detected by the trouble state detecting section 108, a transmission/reception clock generating unit 107b for generating transmission/reception clocks of a speed of 1200 bps in accordance with the control signal from the transmission/reception control unit 107a, and a loopback control unit 107c for monitoring an operating state of the video/audio alarm sections 103a~103n through the interface section 104 and providing a detected result to the data receiving section 106.

The data transmitting section 105 comprises a transmission buffer 105a for buffering in a first-in first-out manner the 8-bit: parallel data received from the trouble state detecting section 108 in accordance with the control signal from the transmission/reception control unit 107a of the video/audio control section 107, a transmission latch 105b for latching the 8-bit parallel data buffered by the transmission buffer 105a in accordance with the control signal from the transmission/reception control unit 107a of the video/audio control section 107, and a parallel/serial conversion unit 105c for converting the 8-bit parallel data received from the transmission latch 105b into serial data in accordance with the transmission clock generated from the transmission/reception clock generating unit 107b of the video/audio control section 107 and providing the converted serial data to the interface section 104.

The data receiving section 106 comprises a serial/parallel conversion unit 106a for converting the responding message received from the interface section 104 and the operating state data of the video/audio alarm sections 103a~103n received from the loopback control unit 107c of the video/audio control section 107 into parallel data in synchronization with the reception clock generated from the transmission/reception clock generating unit 107b, a receiving latch 106b for latching the converted parallel data for a predetermined time in accordance with the control signal from the transmission/reception control unit 107a of the video/audio control section 107, and a receiving buffer 106c for buffering in a first-in first-out manner the latched parallel data in accordance with the control signal from the transmission/reception control unit 107a of the video/audio control section 107, interrupting the central processing unit 108a of the trouble state detecting section 108, and outputting the buffered data to the central processing unit 108a of the trouble state detecting section 108 through the data buffer 108b as state information of the video/audio alarm sections 103a~103n.

The video/audio alarm sections 103a~103n display the video alarm classified by colors such as red, yellow, and green in accordance with the grade of the trouble state data.

The operation of the video/audio alarm processing apparatus for a base station manager according to the present invention as constructed above will be explained in detail with reference to FIGS. 2 to 4.

The interworking processor board assembly 102a provided in the base station manager 102 to drive the video/audio alarm sections 103a~103n is a system matching card packaged in the workstation which is the basis of the base station manager 102, and takes charge of data communications between the workstation and an external system, i.e., the mobile radio communication system by electrically matching the workstation and the external system through the interface section 104 such as RS-422.

The central processing unit 108a and its peripheral device in the trouble state detecting section 108 comprises a 32-bit microprocessor such as MC68030, a clock generating circuit required for operating the microprocessor, and a memory for storing therein basic programs, and performs the internal function control of the interworking processor board assembly 102a, the sparc and data communication function of the workstation.

The trouble state data received from the base station controllers 101 and the base stations 100 is converted into 8-bit parallel data so that the trouble state data is classified by grades and colors and the video and audio alarms are produced, being classified into emergent, important, and general alarms, respectively, in accordance with the grade of the trouble state data. The 8-bit parallel data is stored in the transmission buffer 105a of the data transmission section 105 through the data buffer 108b such as a bidirectional buffer of the trouble state detecting section 108 (step S1 of FIG. 4).

The transmission data detecting unit 108c detects whether the trouble state data exists in the 8-bit parallel data stored in the transmission buffer 105a (step S2 of FIG. 4).

If it is detected that the trouble state data exists in the 8-bit parallel data stored in the transmission buffer 105a, this existence of the trouble state data is informed to the transmission/reception control unit 107a of the video/audio control section 107.

The transmission/reception control unit 107a receives the trouble state data from the transmission data detecting unit 108c, outputs the video and audio alarms to the video/audio alarm sections 103a~103n accordingly, and generates a control signal for controlling the function required for informing the responding message data received from the video/audio alarm sections 103a~103n to the central processing unit 108a.

If the existence of the trouble state data is informed from the transmission data detecting unit 108c, the transmission/reception control unit 107a generates and transmits control signals to the transmission latch 105b, the transmission buffer 105a, the transmission/reception clock generating unit 107b, and the receiving latch 106b of the data receiving section 106 so that the 8-bit parallel data is read out from the transmission buffer 105a such as a first-in first-out (FIFO) buffer and then temporarily stored in the transmission latch 105b.

The transmission latch 105b reads out the data byte by byte, i.e., by 8 bits from the transmission buffer 105a in accordance with the control signal generated from the transmission/reception control unit 107a and temporarily stores the data therein before the parallel/serial conversion.

Meanwhile, the transmission/reception clock generating unit 107b generates the transmission clock signal of 1200 bps, which is required for converting the 8-bit parallel trouble state data into serial data based on the clock generating information received from the transmission/reception control unit 107a, and required for transmitting the serial data to the video/audio alarm sections 103a~103n, and provides the transmission clock signal to the parallel/serial conversion unit 105c of the data transmission section 105.

The transmission/reception clock generating unit 107b also generates the data reception clock signal for receiving the responding message transmitted from the video/audio alarm sections 103a~103n at a speed of 1200 bps after a 2-clock period of the transmission clock signal when the 8-bit serial trouble state data is transmitted at the transmitting speed of 1200 bps, and provides the reception clock signal to the serial/parallel conversion unit 106a of the data receiving section 106.

The parallel/serial conversion unit 105c of the data transmitting section 105 reads out the 8-bit data temporarily stored in the transmission latch 105b, and converts the 8-bit parallel data into serial data in synchronization with the transmission clock signal of 1200 bps transmitted from the transmission/reception clock generating unit 107b.

The interface section 104 such as RS-485 converts the serially converted trouble state data to meet the electrical standard of RS-485, and drives the alarm displays classified by colors such as red, yellow, and green in accordance with the grade of the trouble state data as well as driving the loudspeaker in the video/audio alarm sections 103a~103n to visibly and audibly inform the trouble state to the user (steps S3 and S4).

Also, the interface section 104 converts the responding message received from the video/audio alarm sections 103a~103n into a TTL (transistor transistor logic) electric level, and transmits the converted data to the serial/parallel conversion unit 106a of the data receiving section 106.

The serial/parallel conversion unit 106a converts the serial data inputted from the interface section 104 into the parallel data in synchronization with the reception clock of 1200 bps generated from the transmission/reception clock generating unit 107b of the video/audio control section 107, and temporarily stores the parallel data in the receiving latch 106b.

The receiving buffer 106c reads out the 8-bit parallel data temporarily stored in the receiving latch 106b in accordance with the control signal generated from the transmission/reception control unit 107a, and stores therein the data in a FIFO manner.

At this time, if the responding data of at least one byte received from the video/audio alarm sections 103a~103n exists in the receiving buffer 106c, the receiving buffer 106c sends an interrupt request signal to the central processing unit 108a, and informs the existence of the data in the receiving buffer 106c.

In response to the interrupt request, the central processing unit 108a reads out the data in the receiving buffer 106c through the data buffer 108b, and thus recognizes the operating state of the video/audio alarm sections 103a~103n.

The loopback control unit 107c of the video/audio control section 107 performs the loopback function that it reads out through the receiving buffer 106c the data stored in the transmission buffer 105a by the central processing unit 108a so as to check if the video/audio alarm sections 103a~103n operate in a normal state.

Meanwhile, according to the present invention, the trouble state of the respective systems can be easily monitored from various remote places besides the place where the base station manager is located.

As described above, according to the video/audio alarm processing method and apparatus according to the present invention, the base station manager for managing the trouble state of a plurality of base station controllers and base stations classifies the system trouble state by grades and produces the video alarm classified by colors such as red, yellow, and green, resulting in that the user can easily identify the trouble state and the trouble state grade of the respective systems and thus take the necessary process according to the identified trouble state grade. In addition, since the base station manager can be connected to 6 video/audio alarm devices at maximum by a daisy chain, the system trouble state can be easily monitored from various remote places besides the place where the base station manager is located.

While the present invention has been described and illustrated with reference to the preferred embodiment thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A video/audio alarm processing method for a base station manager in a mobile radio communication system comprising:

receiving trouble state information data from a plurality of base stations and base station controllers;

classifying the trouble state information data by grades:

generating a control signal for processing at least one of video and audio alarms in accordance with the trouble state information data and the grade of the trouble state data; and producing the at least one video and audio alarm in accordance with the grade of the trouble state data.

2. The video/audio alarm processing method of claim 1, wherein the grade of the video and audio alarms corresponding to the grade of the trouble state data is classified into one of an emergent alarm, an important alarm, and a general alarm.

3. The video/audio alarm processing method of claim 1, wherein the video alarm is classified by prescribed colors according to the grade of the trouble state data.

4. The method of claim 1, wherein both the audio and video alarm are produced.

5. The method of claim 1, wherein an interworking processor board receives the trouble state information data and generates the control signals.

6. The method of claim 1, wherein the control signal comprises a control clock signal and at least one processing control signal.

7. A video/audio alarm processing apparatus for a base station manager in a mobile radio communication system including an interworking processor board assembly for receiving and processing data transmitted from a plurality of base station controllers and base stations as video and audio alarms, the interworking processor board assembly comprising:

a trouble state detecting section for receiving the data of a predetermined number of bits transmitted from the base station controllers and the base stations and detecting existence of trouble state data;

a video/audio control section for generating control clocks of a predetermined speed and control signals for the process of the video and audio alarms in accordance with an input of the detected trouble state data;

a data transmitting section for converting and transmitting the data received from the trouble state detecting section in accordance with the control clock and the control signal generated from the video/audio control section;

at least one video/audio alarm section for producing at least one video and audio alarm in accordance with a trouble state grade of the trouble state data;

an interface section for interfacing the data transmitted from the data transmitting section to the video/audio alarm section and interfacing message data responding to the transmitted data outputted from the video/audio alarm section; and a data receiving section for converting and transmitting to the trouble state detecting section the responding message received through the interface section in accordance with the control clock and the control signal generated from the video/audio control section.

8. The video/audio alarm processing apparatus of claim 7, wherein the trouble state detecting section comprises:

a central processing unit and its peripheral device for receiving and processing the data transmitted from the base station controllers and base stations;

a data buffer for buffering the data received from the central processing unit and the responding message received from the data receiving section; and a transmission data detecting unit for detecting whether the trouble state data exists in the data buffered by the data buffer.

9. The video/audio alarm processing apparatus of claim 7, wherein the video/audio control section comprises:

a transmission/reception control unit for generating a control signal for controlling transmission/reception of the trouble state data if the existence of the trouble state data is detected by the trouble state detecting section;

a transmission/reception clock generating unit for generating transmission and reception clocks of a predetermined speed in accordance with the control signal from the transmission/reception control unit; and a loopback control unit for monitoring an operating state of the at least one video/audio alarm section through the interface section and providing a detected result to the data receiving section.

10. The video/audio alarm processing apparatus of claim 9, wherein the predetermined speed of the transmission clock is 1200 bps.

11. The video/audio alarm processing apparatus of claim 9, wherein the predetermined speed of the reception clock is 1200 bps.

12. The video/audio alarm processing apparatus of claim 7, wherein the data transmitting section comprises:

a transmission buffer for buffering the data received from the trouble state detecting section in accordance with the control signal from the video/audio control section;

a transmission latch for latching the data buffered by the transmission buffer in accordance with the control signal from the video/audio control section; and a parallel/serial conversion unit for converting the data received from the transmission latch into serial data in accordance with the transmission clock provided from the video/audio control section and providing the converted serial data to the interface section.

13. The video/audio alarm processing apparatus of claim 7, wherein the data receiving section comprises:

a serial/parallel conversion unit for converting the responding message received from the interface section and the operating state data of the at least one video/audio alarm section received from the video/audio control section into parallel data in synchronization with the reception clock from the video/audio control section;

a receiving latch for latching the converted parallel data for a predetermined time in accordance with the control signal from the video/audio control section; and a receiving buffer for buffering the latched parallel data in accordance with the control signal from the video/audio control section and outputting the buffered data to the trouble state detecting section as state information of the at least one video/audio alarm section.

14. The video/audio alarm processing apparatus of claim 7, wherein the grade of the video and audio alarms corresponding to the grade of the trouble state data is classified into an emergent alarm, an important alarm, and a general alarm.

15. The video/audio alarm processing apparatus of claim 7, wherein the at least one video/audio alarm section displays the video alarm classified by colors such as red, yellow, and green according to the grade of the trouble state data.

\* \* \* \* \*